(12) United States Patent
Repesse et al.

(10) Patent No.: US 11,186,299 B2
(45) Date of Patent: Nov. 30, 2021

(54) BEARING HOUSING, AND BOGIE FOR RAIL VEHICLES COMPRISING A HOUSING OF THIS KIND

(71) Applicant: Aktiebolaget SKF, Gothenburg (SE)

(72) Inventors: Jonathan Repesse, Tours (FR); Thierry Le Moigne, Luynes (FR)

(73) Assignee: Aktiebolaget SKF, Gothenburg (SE)

( * ) Notice: Subject to any disclaimer, the term of this patent is extended or adjusted under 35 U.S.C. 154(b) by 353 days.

(21) Appl. No.: 16/283,994

(22) Filed: Feb. 25, 2019

(65) Prior Publication Data

US 2019/0276057 A1 Sep. 12, 2019

(30) Foreign Application Priority Data

Mar. 6, 2018 (FR) ........................................ 1851902

(51) Int. Cl.
| | |
|---|---|
| *B61F 5/38* | (2006.01) |
| *B61F 5/24* | (2006.01) |
| *B61F 5/32* | (2006.01) |
| *B61F 15/22* | (2006.01) |
| *B61F 5/52* | (2006.01) |

(52) U.S. Cl.
CPC .................. *B61F 5/38* (2013.01); *B61F 5/24* (2013.01); *B61F 5/325* (2013.01); *B61F 15/22* (2013.01); *B61F 5/52* (2013.01); *F16C 2326/10* (2013.01)

(58) Field of Classification Search
CPC .... B61F 5/22; B61F 5/24; B61F 5/325; B61F 5/38; B61F 5/52; B61F 15/00; B61F 15/02; B61F 15/06; B61F 15/12; B61F 15/22; B61F 15/26; F16C 33/78; F16C 33/1803; F16C 33/7813; F16C 33/7816; F16C 23/06; F16C 23/08; F16C 23/10
See application file for complete search history.

(56) References Cited

U.S. PATENT DOCUMENTS 6,126,321 A * 10/2000 Fetty ..................... F16C 19/386
384/459

FOREIGN PATENT DOCUMENTS

| CN | 104290770 A | 1/2015 |
|---|---|---|
| DE | 102015212067 A1 | 12/2016 |
| EP | 2786911 A1 | 10/2014 |
| FR | 577520 A | 9/1924 |
| JP | H0576937 U | 10/1993 |

* cited by examiner

*Primary Examiner* — Robert J McCarry, Jr.
(74) *Attorney, Agent, or Firm* — Garcia-Zamor Intellectual Property Law; Ruy Garcia-Zamor; Bryan Peckjian

(57) ABSTRACT

A bearing housing including a casing; a rotary bearing with an exterior race mounted inside a bore of the casing, an interior race adapted to be mounted on a shaft and rolling members between the races; and a cap fastened to a front-end face of the shaft, the cap forming an abutment for the interior race on the front face. The bearing housing also comprises a sealing ring mounted in the cap and intended to be clamped axially between the end face of the shaft and the cap.

18 Claims, 2 Drawing Sheets

BEARING HOUSING, AND BOGIE FOR RAIL VEHICLES COMPRISING A HOUSING OF THIS KIND

CROSS-REFERENCE

This application claims priority to French patent application no. 1851902 filed on Mar. 6, 2018, the contents of which are fully incorporated herein by reference.

TECHNOLOGICAL FIELD

The present invention concerns the field of rotary bearings, and in particular those intended to be incorporated in a bearing housing of a rail vehicle bogie.

BACKGROUND

In the field of rail transport, a vehicle such as a carriage generally comprises one or more bogies, each bogie being supported by one or more axles fastened to two wheels. These bogies are connected to bearing housings comprising a rotary bearing designed to provide the pivot connection between the bearing housing and the axle. For example, a classic carriage comprises two bogies, each bogie being supported by two axles. In this case, each bogie comprises four bearing housings each containing a rotary bearing.

A bearing housing generally comprises a cylindrical casing, at least one rotary bearing being inserted in a bore formed in the cylindrical casing. One end of a shaft extends into a rear opening of the casing, a journal extending the shaft end and being arranged in the rotary bearing. The front opening of the casing is closed by a cover.

The rotary bearing generally comprises an exterior race mounted in the bore of the casing, the exterior race being immobilized axially between the cover on the front face and an abutment fastened to the casing on the rear face. The rotary bearing also comprises an interior race mounted on the shaft end journal, the interior race being retained axially between a cap fixed to the journal on the front face and a retaining ring on the rear face against a shoulder of the journal. The exterior race is fixed and the interior race turns, at least one row of rolling members being disposed between the relatively rotatable races.

The cap has an annular general shape and classically comprises an essentially circular plate, provided with a plurality of openings for the passage of retaining screws fixed to the shaft end journal. This plate generally comprises a central bore. The cap also comprises an annular rim extending radially from the periphery of the plate, the rim coming to abut against the interior race of the rotary bearing. The journal and the plate are axially separated from one another, forming an annular open portion closed in the radial direction by the rim.

It is moreover known to provide a hollow shaft defining a central bore in such applications to rail vehicles in order to reduce the weight of the shaft, and therefore the weight of the arrangement in the bearing housing, and thus to reduce the energy consumption of the rail vehicle.

However, in the event of large variations of temperature, the air present in the hollow shaft can condense and create water in liquid form. This water can then come to flow into the open portion that exists between the cap and the shaft end journal.

Moreover, it is classic to carry out an ultrasound inspection of the shaft during a maintenance operation to detect internal defects or cracks. In order to facilitate the transmission of sound energy between an ultrasound probe and the shaft, a coupling medium is injected into the hollow shaft. This coupling medium is generally an oil, for example glycerin, and the quantity injected can be approximately 30 ml. Following the inspection, this oil is found to be collected in the open portion that exists between the cap and the shaft end journal.

Water, oil, and even metal particles can therefore be found collected in the open portion and form internal pollution that cannot be removed without completely dismantling the bearing housing.

When the bearing housing and the axial shaft are in operational mode, shocks and vibrations can induce migration of this internal pollution toward the components inside the bearing housing. This internal pollution can have for consequence accelerated deterioration of the components inside the bearing housing. Water can in particular generate a phenomenon of corrosion notably responsible for a reduction in the quality of the contact between the rolling members and the races of the rotary bearing, and also reduced lubrication performance of the grease introduced into the rotary bearing. This results in a reduction of the quality of the mechanical connection provided in the bearing housing and a reduced service life of the components inside the bearing housing. The risk of breaking, notably in operational mode, is also higher.

In order to alleviate this disadvantage, it is known to provide a through-opening in the lower portion of the bore of the casing in order to evacuate residual liquid water. However, a hole of this kind has the drawback of forming a passage for exterior pollution to the interior of the bearing housing. Moreover, a hole of this kind is not reliable for other types of internal pollution, in particular residual oil following ultrasound inspection.

Accordingly, in the field of rail transport, regular maintenance operations are carried out during which the components of the bearing housing are demounted and then cleaned and inspected. If necessary, the grease can be drained from the rotary housing in order to replace it. Finally, the components of the bearing housing are reassembled. However, maintenance operations of this kind are costly, relatively lengthy and necessitate frequency immobilization of the rail vehicle.

SUMMARY

The present invention aims to remedy these disadvantages.

The present invention more particularly aims to provide a bearing housing offering reliable operation, good reliability over time, and no necessity for a multiplicity of maintenance operations.

The invention concerns a bearing housing to receive a shaft of an axle, comprising a cylindrical casing, a rotary bearing, and a cap.

The cylindrical casing is provided with a bore with an opening on the rear face able to receive an end of the shaft and an opening on the front face closed by the cover.

The rotary bearing is provided with a fixed exterior race mounted in the bore of the casing, a turning interior race adapted to be mounted on an exterior cylindrical surface of the shaft end, and at least one row of rolling members disposed between the races.

The cap is of annular general shape and provided with a radial plate, with a plurality of openings through which pass dedicated retaining screws to be fixed to an end face at the shaft end, and an annular rim extending axially from the exterior periphery of the plate, the rim coming to abut against the interior race of the rotary bearing on the front face.

According to the invention, the bearing housing also comprises a sealing ring mounted in the cap, the sealing ring being arranged radially in the annular rim of the cap and being intended to be clamped axially between the end face at the shaft end and the plate of the cap.

According to other advantageous but not obligatory features of a bearing housing according to the invention, separately or in combination:

The bearing housing comprises a retaining ring mounted on the shaft end, axially between a shoulder of the shaft and the interior race of the rotary bearing on the rear face.

The bearing housing comprises an abutment fastened to the casing on the rear face, the exterior race of the rotary bearing being immobilized axially between the cover and the abutment.

The abutment comprises a plurality of openings through which pass retaining screws fixed to the casing on the rear face.

The cover comprises a plurality of openings through which pass retaining screws fixed to the casing on the front face.

The rolling members are cylindrical rollers.

The rolling members are regularly spaced by a cage.

The rotary bearing comprises two rows of rolling members.

The exterior race is formed in one piece.

The interior race is formed of two parts, each supporting a row of rolling members, a spacer being disposed axially between the parts.

The rotary bearing comprises a first sealing means disposed between the exterior race and the interior race at the front axial end of the bearing and a second sealing means disposed between the exterior race and the interior race at the rear axial end of the bearing.

The plate of the cap comprises a central bore.

The sealing ring comprises a central bore.

The inside diameters of the central bores of the sealing ring and the plate of the cap are substantially equal.

The sealing ring is solid, comprising no bores.

The sealing ring comprises a plurality of openings axially facing the openings of the plate of the cap, the openings of the sealing ring and of the cap having passed through them dedicated retaining screws that are to be fixed to the end face at the shaft end.

The sealing ring is made of polymer material.

The sealing ring is made of butadiene-acrylonitrile copolymer, also known as "nitrile rubber".

The invention also concerns a rail vehicle bogie comprising at least one axle provided with a shaft and at least one bearing housing in accordance with any of the foregoing embodiments mounted on one end of the shaft.

The shaft is advantageously hollow with a bore.

BRIEF DESCRIPTION OF THE DRAWINGS

The invention will be better understood on reading the following description given by way of nonlimiting example only.

The description is given with reference to the appended drawings in which.

DETAILED DESCRIPTION

Figure 1:
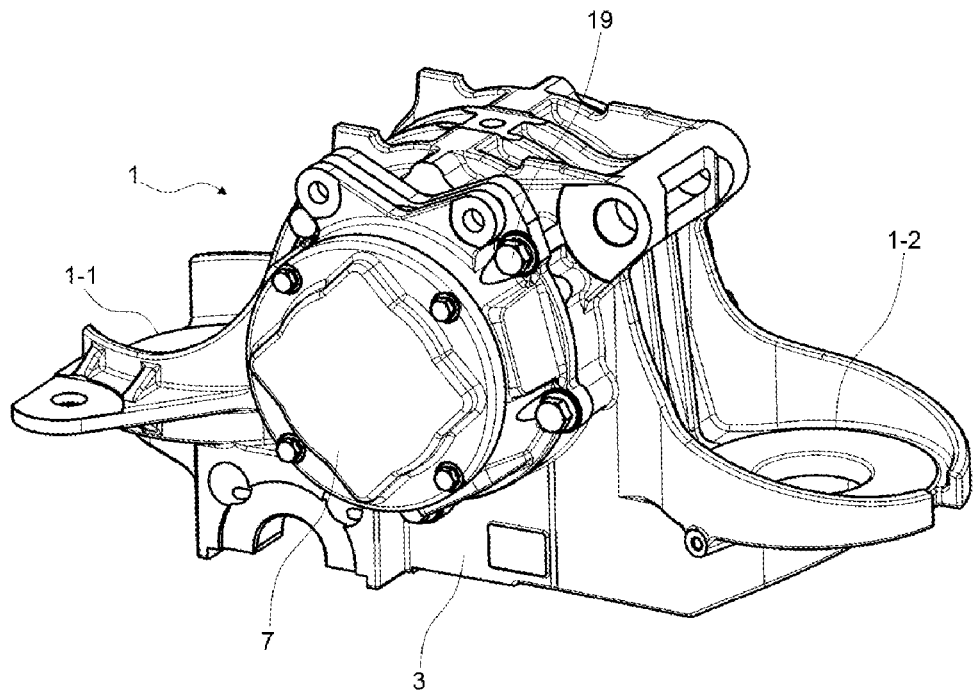
FIG. 1 is a perspective view of a bearing housing according to one embodiment of the invention.
Figure 2:
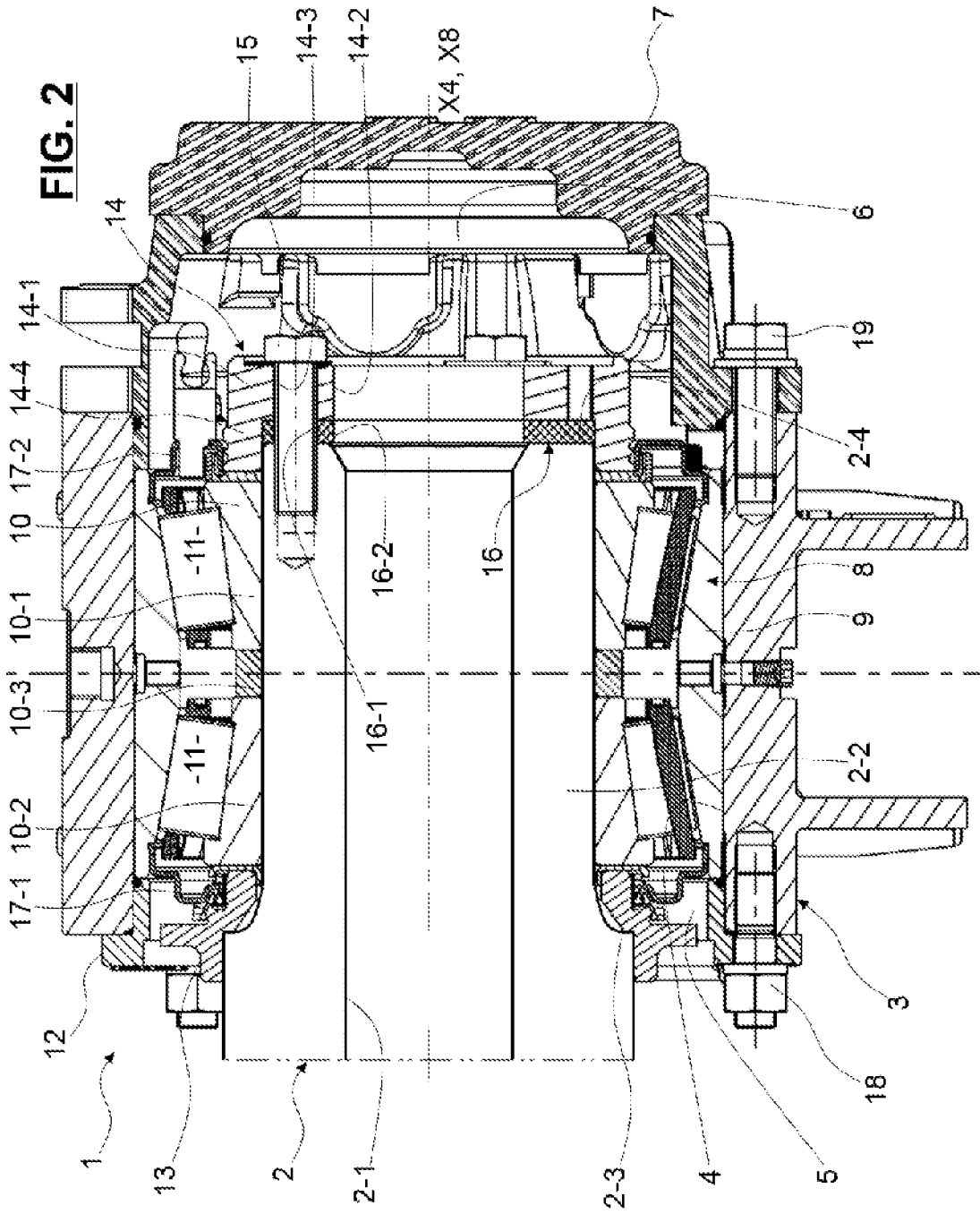
FIG. 2 is a view in axial section of the bearing housing from FIG. 1.

Referring to FIGS. 1 and 2, a bearing housing 1 is intended to be fastened to a bogie of a rail vehicle in such a manner as to support via a pivot connection an axle fastened to the wheels of the rail vehicle.

For the remainder of the description, the terms "front" and "rear" are defined for the position of the bearing housing relative to the bogie. A front position is one with a face of the housing situated axially toward the exterior of the bogie, while a rear position is one with a face of the housing situated toward the interior of the bogie.

The bearing housing 1 comprises two fixing ends 1-1 and 1-2 enabling the housing to be fixed to a rail vehicle bogie (not shown). This fixing can be affected in the classic manner, each end 1-1 and 1-2 being fixed to one end of a rod of a damper coupled to a suspension (not shown).

The axle comprises a hollow shaft 2 provided with a cylindrical central bore 2-1. The hollow shaft 2 is extended at its end by a journal 2-2.

The housing 1 comprises a cylindrical casing 3 with a cylindrical central bore 4 with axis X4. The casing 3 comprises an opening 5 of the bore 4 on the rear face in such a manner as to receive the shaft 2. The casing 3 comprises an opening 6 of the bore 4 on the front face, the front opening 6 being closed by a cover 7.

To provide the pivot connection between the axle and the bearing housing 1, the housing 1 comprises a rotary bearing 8 with axis X8 with an exterior race 9, an interior race 10, and rolling members 11 disposed radially between the races 9, 10. In the normal operating mode of the bearing housing 1, the axes X4 and X8 coincide. In this embodiment, the rotary bearing 8 comprises two rows of tapered rollers as the rolling members 11. The rolling members are advantageously held regularly spaced by cages. A different bearing can be used without departing from the scope of the invention, for example with only one or more than two rows of rolling members, with other types of rolling members such as cylindrical rollers, needles or balls.

The rotary bearing 8 advantageously comprises a first sealing flange 17-1 disposed between the exterior race 9 and the interior race 10 at the front axial end of the bearing 8 and a second sealing flange 17-2 disposed between the exterior race 9 and the interior race 10 at the rear axial end of the bearing 8. The rolling space between the two races 9, 10 in which the rolling members 11 are housed is therefore isolated from the exterior environment and can contain a lubricant fluid, for example grease.

The exterior race 9 is mounted in the cylindrical bore 4 formed in the casing 3. The exterior race 9 is retained axially on one side by an abutment 12 and on the other by the cover 7. The abutment 12 is fastened to a rear end surface of the casing 3 by a plurality of retaining screws 18 and the cover 7 is fastened to a front-end surface of the casing 3 by a plurality of retaining screws 19. The exterior race 9 is fixed and is fastened to the casing 3.

The interior ring 10 is fitted over an exterior cylindrical surface of the journal 2-2 of the shaft 2. In this embodiment, the interior race 10 is made up of two parts 10-1 and 10-2, a spacer 10-3 being disposed axially between the parts. The interior race 10 is held axially between a retaining ring 13 and a cap 14.

The retaining ring 13 is mounted on the journal 2-2 of the shaft 2, axially between a shoulder 2-3 of the shaft and the interior race 10 of the rotary bearing 8 on the rear face.

The cap 14 is of annular general shape and provided with a radial plate 14-1, with a cylindrical bore 14-2 and a plurality of openings 14-3 through which pass retaining screws 15 fixed to a front-end face 2-4 of the journal end 2-2 of the shaft 2. The cap 14 is also provided with an annular rim 14-4 extending axially from the exterior periphery of the plate 14-1. The rim 14-4 comes to abut against the interior race 11 of the rotary bearing 8 on the front face.

Figure 3:
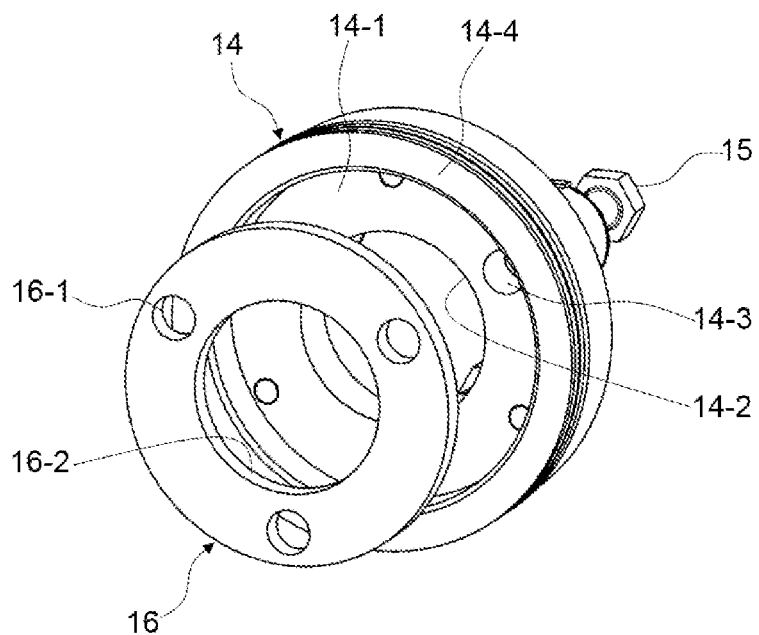
FIG. 3 is an exploded perspective view of a cap and a sealing ring for the bearing housing from FIG. 2.

According to the invention, the bearing housing 1 also comprises a sealing ring 16 shown in FIG. 3.

The sealing ring 16 is annular with an essentially cylindrical body. The sealing ring 16 is mounted in the cap 14, the sealing ring 16 being arranged radially in the annular rim 14-4 of the cap 14.

The sealing ring 16 comprises a plurality of openings 16-1 axially facing the openings 14-3 of the plate 14-1 of the cap 14. The openings 16-1, 14-3 of the sealing ring 16 and the cap 14, respectively, have passed through them the retaining screws 15 fixed to the end face 2-4 of the shaft 2. The sealing ring 16 is arranged axially between the end face 2-4 of the shaft 2 and the plate 14-1 of the cap 14.

The sealing ring 16 further comprises a cylindrical central bore 16-2. The bore 16-2 of the sealing ring 16 advantageously has an inside diameter substantially equal to that of the bore 14-3 of the plate 14-1 of the cap 14.

The sealing ring 16 is made of polymer material. In a particularly advantageous manner the sealing ring 16 is made of butadiene-acrylonitrile copolymer, also known as "nitrile rubber".

Thanks to the invention, all of the open portion between the cap 14 and the end 2-2 of the shaft 2 is open. No interior pollution, such as water, oil or metal particles, can find itself trapped between these elements.

During a maintenance operation, only the cover 7 on the front face of the casing 3 has to be demounted to clean the interior of the bearing housing 1, all the internal zones of the housing 1 being easily accessible from the front opening 6.

Moreover, the cap 14 and the sealing ring 16 both being provided with a central bore 14-2 and 16-2, respectively, it is possible to clean the cylindrical bore 2-1 of the hollow shaft 2.

Thanks to complete cleaning of the bearing housing 1 according to the invention during a maintenance operation, the risks of condensation and the risks of pollution of the moving parts, such as the rings 9, 10 and the rolling members 11 of the rotary bearing 8, are avoided. The quality of the contact between the surfaces in contact and the properties of the grease are then preserved. The result of this is an improvement in the quality of the mechanical connection provided in the bearing housing and an increased service life of the internal components of the bearing housing. The risk of breakage, notably in the operating mode, is also lower.

According to an alternative that is not shown, the sealing ring 16 is solid, comprising no bores. The sealing ring therefore enables closing of the bore 2-1 of the hollow shaft 2 and prevention of any entry of internal pollution from the hollow shaft to the interior volume of the bearing housing 1.

Moreover, some or all of the technical features of the various embodiments may be combined with one another. Thus, the bearing housing can be adapted in terms of cost, performance and simplicity of implementation.

What is claimed is:

1. A bearing housing adapted to receive a shaft of an axle, the bearing housing comprising:
   a cylindrical casing provided with a bore with an opening on the rear face adapted to receive an end of the shaft and an opening on the front face closed by a cover,
   a rotary bearing provided with a fixed exterior race mounted in the bore of the casing, a rotatable interior race adapted to be mounted on a cylindrical exterior surface of the end of the shaft, and at least one row of rolling members disposed between the races, and
   a cap of annular shape provided with a radial plate with a plurality of openings through which pass dedicated retaining screws that are adapted to be fixed to an end face at the end of the shaft and an annular rim extending axially from the exterior periphery of the plate, the annular rim coming to abut against the interior race of the rotary being on the front face, the annular rim adapted to overlay a portion of the cylindrical exterior surface of the end of the shaft, wherein
   the bearing housing also comprises a sealing ring mounted in the cap, the sealing ring being arranged radially in the annular rim of the cap and configured to be clamped axially between the end face of the end of the shaft and the plate of the cap, the dedicated retaining screws extending through the sealing ring.

2. The bearing housing according to claim 1, wherein the sealing ring comprises a plurality of openings axially facing the openings of the plate of the cap, dedicated retaining screws that pass through the openings of the sealing ring and the cap to be fixed to the end face of the end of the shaft.

3. The bearing housing according to claim 1, wherein the plate of the cap comprises a central bore.

4. The bearing housing according to claim 3, in which the sealing ring comprises a central bore.

5. The bearing housing according to claim 4, wherein the inside diameters of the central bores of the sealing ring and the plate of the cap are substantially equal, wherein the central bore of the plate of the cap and the central bore of the sealing ring are configured to be aligned with a bore of the shaft.

6. The bearing housing according to claim 1, wherein the sealing ring is solid.

7. The bearing housing according to claim 1, wherein the sealing ring is made of polymer material.

8. The bearing housing according to claim 7, wherein the sealing ring is made of butadiene-acrylonitrile copolymer.

9. A rail vehicle bogie comprising: at least one axle provided with a shaft, and at least one bearing housing according to claim 1, wherein the at least one bearing housing being mounted on an end of the shaft.

10. The rail bogie according to claim 9, wherein the shaft is hollow and provides a bore.

11. A bearing housing adapted to receive a shaft of an axle, the bearing housing comprising:
    a cylindrical casing provided with a bore with an opening on the rear face adapted to receive an end of the shaft and an opening on the front face closed by a cover;
    a rotary bearing provided with a fixed exterior race mounted in the bore of the casing, a rotatable interior race adapted to be mounted on a cylindrical exterior surface of the end of the shaft, and at least one row of rolling members disposed between the races;
    a cap of annular shape provided with a radial plate with a plurality of openings through which pass dedicated retaining screws that are adapted to be fixed to an end face at the end of the shaft and an annular rim extending axially from the exterior periphery of the plate, the annular rim coming to abut against the interior race of the rotary being on the front face, the annular rim adapted to overlay a portion of the cylindrical exterior surface of the end of the shaft, the cap defining a central bore aligned with a central bearing axis;

the bearing housing also comprises a sealing ring mounted in the cap, the sealing ring being arranged radially in the annular rim of the cap and configured to be clamped axially between the end face of the end of the shaft and the plate of the cap, the dedicated retaining screws extending through the sealing ring;

the cover is positioned over the central bore of the cap and is secured to the cylindrical casing.

12. The bearing housing of claim 11, wherein an outer ring is positioned on an inner surface of the cylindrical casing.

13. The bearing housing of claim 12, wherein the cover is attached to the cylindrical housing at a location radially outwardly, relative to the central bearing axis, from the outer ring.

14. The bearing housing according to claim 13, wherein the sealing ring is solid.

15. The bearing housing according to claim 13, wherein the sealing ring is made of polymer material.

16. The bearing housing according to claim 15, wherein the sealing ring is made of butadiene-acrylonitrile copolymer.

17. A rail vehicle bogie comprising: at least one axle provided with a shaft, and at least one bearing housing according to claim 11, wherein the at least one bearing housing being mounted on an end of the shaft.

18. The rail bogie according to claim 17, wherein the shaft is hollow and provides the bore.

* * * * *